No. 620,968. Patented Mar. 14, 1899.
A. L. RIKER.
MOTOR VEHICLE.
(Application filed Feb. 11, 1898.)
(No Model.) 2 Sheets—Sheet 1.
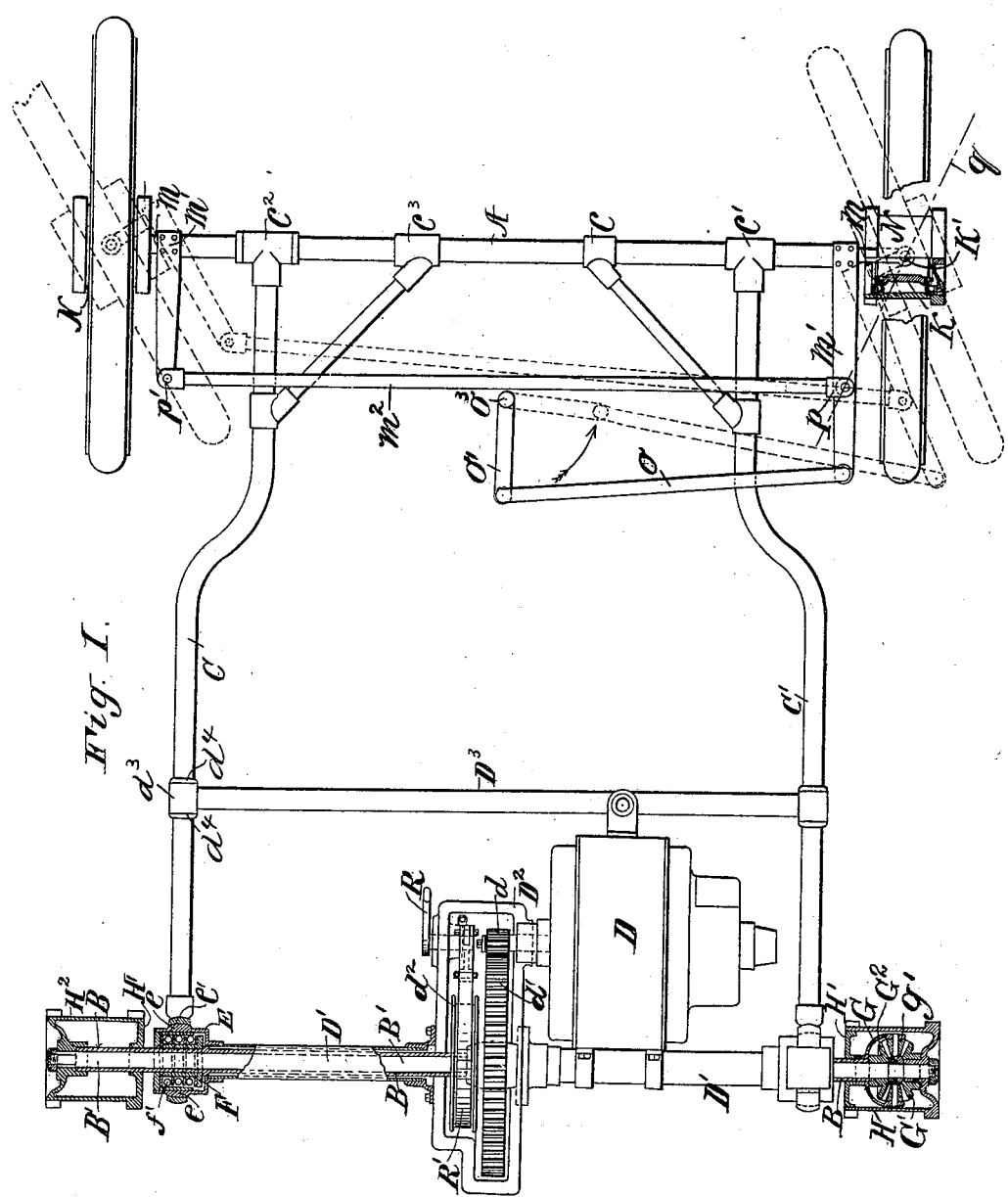

No. 620,968. Patented Mar. 14, 1899.
A. L. RIKER.
MOTOR VEHICLE.
(Application filed Feb. 11, 1898.)
(No Model.) 2 Sheets—Sheet 2.
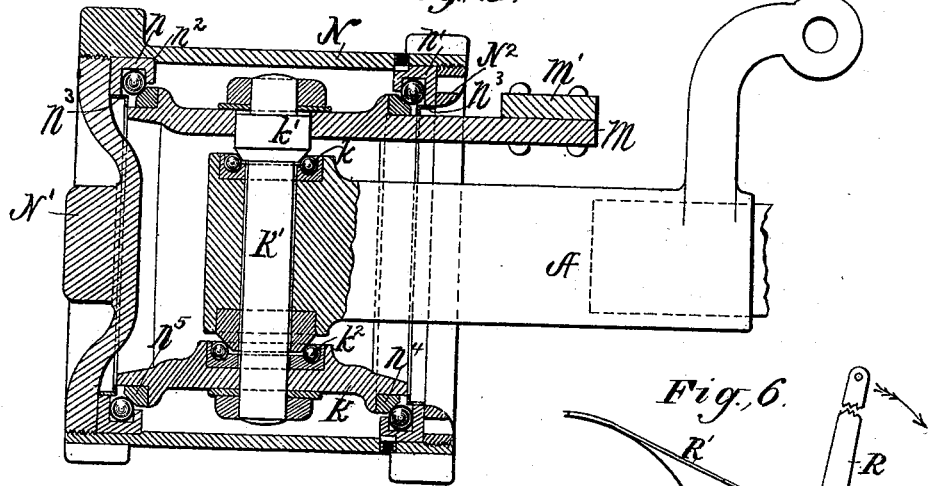
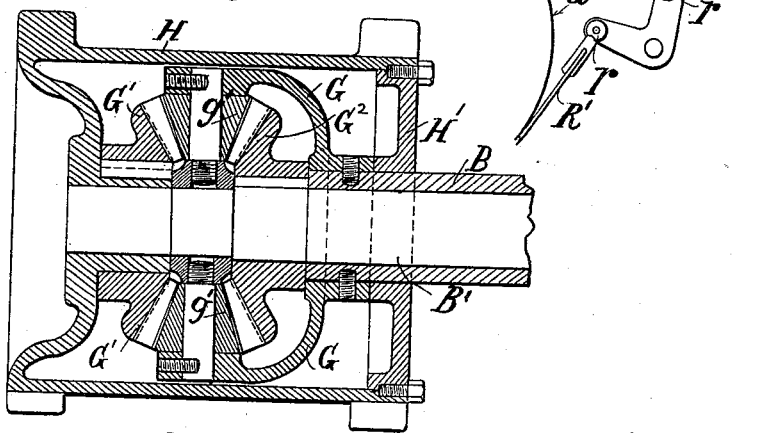
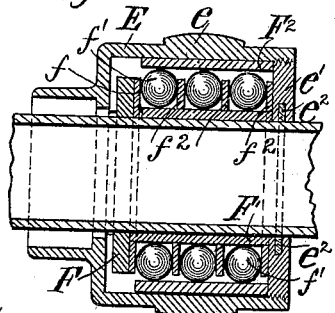
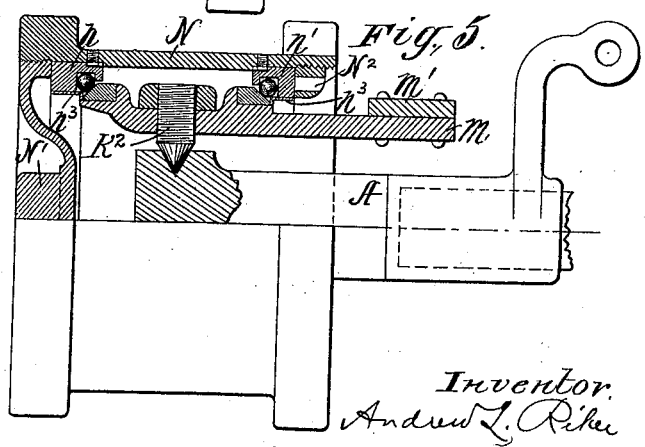
Witnesses
W. Rees Edelen,
Inventor
Andrew L. Riker
by Robert Mauro
Attys.

UNITED STATES PATENT OFFICE.

ANDREW L. RIKER, OF NEW YORK, N. Y.

MOTOR-VEHICLE.

SPECIFICATION forming part of Letters Patent No. 620,968, dated March 14, 1899.

Application filed February 11, 1898. Serial No. 669,947. (No model.)

*To all whom it may concern:*

Be it known that I, ANDREW L. RIKER, of New York, State of New York, have invented new and useful Improvements in Motor-Vehicles, which improvements are fully set forth in the following specification.

This invention relates to the construction of motor-vehicles, and more particularly to the running-gear thereof, comprising the frame, axles, driving mechanism, brake, and steering-gear.

The improved running-gear herein described, while contrived with special reference to the employment of an electric motor for propulsion, is applicable, as will be seen, to other suitable motors, the motor itself forming no part of the present invention.

Study of the conditions attending the use of self-propelled vehicles and practical experience therewith have shown that they differ materially from those attending the use of vehicles drawn by an external power and that to meet successfully the conditions arising in practical use many departures in construction from the best types of ordinary vehicles are necessary or desirable.

The object of the present invention is in general to meet practically these new conditions and to provide a system of construction for self-propelled vehicles characterized by simplicity, strength, durability, flexibilty, and facility for manipulation.

The particular objects sought by this invention and means whereby they are attained can best be explained in connection with the accompanying drawings, in which—

Figure 1 is a plan view, partly in section, of the running-gear of a self-propelled vehicle; and Fig. 1$^a$ is a detail view. Fig. 2 is a vertical sectional view lengthwise of the hub of one of the front wheels. Fig. 3 is a longitudinal sectional view of the rear axle or driving-shaft, showing the compensation-gearing in the hub of one of the wheels. Fig. 4 is a similar view of one of the ball-bearings of the rear shaft. Fig. 5 shows a modification of the construction illustrated in Fig. 2, and Fig. 6 is a detail of the brake.

The principal parts of the frame are the forward axle A, the rear axle B, and the tubular side bars C C', Fig. 1, forming approximately a rectangular figure. The side bars are placed farther apart than in ordinary vehicles. The motor D, of any suitable type, is supported by one of the sleeves D', inclosing the rear axle, by the housing D$^2$ of the driving-gear, and by a cross-bar D$^3$. The motor may be supported at its forward end from the vehicle-body as follows: A depending rod is pivoted to a lug on the bottom of the vehicle-body. This rod passes through an eye on a horizontal plate or nose extending forward from the motor-casing. Above the nose is a nut adjustable on the rod, and on the lower end of the rod is a second adjustable nut. Coil-springs surround the rod one above and the other below the nose of the motor-casing and have their ends pressing, respectively, against the nose and washers held by the nuts. The object of this construction is to take up the vibratory motion to which motors are subject on first starting. The connections of the side bars with the axles are such as to meet the requirements of rigidity and strength on the one hand and flexibility in the desired directions on the other.

In the ordinary type of running-gear the front axle is arranged to turn freely upon a king-bolt, while the vehicle-body is supported upon a frame consisting of the rear axle, a bolster carried upon the front axle by the king-bolt or fifth-wheel, and connections that hold the bolster parallel with the rear axle, the frame being approximately rectangular.

In the present construction since the body is supported (by means of springs, not shown) directly upon the front axle without the interposition of the bolster the front axle must be retained in substantially the same vertical plane with respect to the body. Otherwise if this axle were free to turn there would be a lateral strain or twisting of the connections between the two parts. It is also necessary in this part of the mechanism to make provision for one axle assuming a different angular position from the other, as when one wheel is lifted by an obstacle or irregularity in the surface of the road while the other wheels remain at a lower level or when one wheel sinks into a rut. In case of a rigid frame this would produce a dangerous strain on the joints and also a twist or torsion on the side bars and axles. The strain, moreover, is proportional to the distance apart of the side bars, which it is advantageous to motor-vehicles to make as great as possible. These conditions are met, according to the present invention, by making the connection between one of the cross-bars and an axle rigid, while the other connections are loose. In the form I prefer one side bar (say C') is rigidly connected at its forward end with the front axle, the connection being made, as shown, by hollow union-pieces $c$ $c'$, surrounding the axle and brazed or otherwise secured thereto. The union-pieces $c^2$ $c^3$ of the other side bar C are not rigidly attached to the axle A, but, on the contrary, loosely surround the same and are held from longitudinal movement by collars made fast upon the axle in any way. Thus when one of the wheels is elevated the tendency of the axle to twist and shift its position relative to the side bar produces no strain.

The side bars are tied together toward the rear by the cross bar or brace $D^3$, already referred to. The ends of this brace are not fastened rigidly to the side bars, but by means of union-pieces of peculiar form, so as to allow of sufficient play of the parts. These union-pieces may be described as follows: A coupling $d^3$ surrounds each side bar loosely and is free to turn thereon, but is held from longitudinal movement by collars $d^4$, made fast on the bar. Integral with this coupling is another similar coupling $d^5$ (see Fig. 1ª) below the first and having its axis at right angles to that of the first. This lower coupling surrounds the end of the cross-brace loosely, but is held from longitudinal movement thereon by a head or enlargement of some sort at each end of the brace, one pressing against each coupling. The connection of the rear ends of the side bars is also devised with reference to this incident of use and to give the required rigidity of connection between the front and rear axles, while providing at the same time for the requisite flexibility. The sleeves D', inclosing the rear axle, (or driving-shaft,) have near their outer ends an enlargement or casing E, containing the ball-bearings. (See also Fig. 4.) This casing has surrounding it a bearing ring or band whose surface is of spherical convexity, constituting a spherical seating. The side bar terminates in a collar $e'$ whose inner surface has a corresponding concavity, constituting, with the seating $e$, a universal joint. Thus the side bars can move both horizontally and vertically to the necessary extent and with perfect freedom relatively to the rear axle, while the joint at the same time possesses the requisite strength. The elasticity of side bar C is sufficient to permit the necessary "give" or play of the parts. The vehicle-body is held above the front axle by springs attached to eyes. (Seen in Figs. 2 and 5.) It is not, of course, necessary, though it is advantageous, that the connection of the side bars to the axle should surround the bearings of the latter.

The construction of the ball-bearings will now be explained with reference to Figs. 1 and 4. Since the two are identical in construction, a description of one will suffice. The casing or journal-box E, as already stated, is fastened to the sleeve D', within which the driving-shaft B rotates. The outer side of the casing is closed by a ring $e'$, screwed into the casing and having in its inner edge a circular felt or other washer $e^2$, which is in contact with the surface of the shaft B and makes a tight joint, excluding dust, &c. Within the casing and fast on shaft B is a collar F, which has on one side a hardened-steel face $f$, which constitutes a bearing-surface for the adjacent series of balls $f'$. The entire ball-race is formed by this collar, a hardened ring F' surrounding the shaft and turning with it and a series of transverse washers $f^2$, of hardened steel, separating the adjacent series of balls, of which there may be any desired number. These parts form the movable bearing-surfaces. The stationary surface is formed by the head-ring $F^2$, attached to the inner wall of the casing. The construction is such that the entire bearing can be readily removed and replaced.

The thrust of the shaft is taken between the collar F on one side and the ring $e'$ on the other. The parts are very easily assembled and adjusted to proper working positions, and it is only necessary in order to take up wear and looseness to screw up the rings $e'$, which tends to put a tensile strain on the sleeve D' and a compression strain upon the shaft B. Thus each ring $e'$ and its corresponding collar F press firmly upon the intervening balls. It is found that this construction obviates the necessity of adjustment of the ball-bearings, which is a very difficult operation for unskilled persons.

It is well understood that when the vehicle makes a turn or deviates from a right line the opposite wheels on the same axle rotate with differential speed and in extreme cases may even rotate in opposite directions. For this reason it is necessary that each of the two wheels of a pair should be capable of absolutely independent rotation. In the case of the driving-wheels, which must both be positively connected with and driven by the driving-shaft, the provision for independent revolution of each wheel has presented one of the most difficult mechanical problems in the construction of motor-vehicles. The ordinary solution of this problem consists in dividing the driving-shaft in the middle or, rather, in providing two shafts, one for each wheel, the shafts being connected at their adjacent ends by a compensating driving connection, a familiar form of which comprised a bevel-gear on the end of each shaft and two pinions engaging therewith carried by a driving-wheel rotating on the axis of the shaft as a center. In straightforward motion the pinions acted simply as driving-keys for the bevel-gears; but in case of a turn the pinions turned on their own axes as far as necessary to compensate for the differential speeds of the two wheels. The main objections to this system are weakness due to dividing the driving-shaft at or near the middle thereof, complexity of construction, and inaccessibility for repairs.

The compensating driving-gear which constitutes a part of the present invention is illustrated in Figs. 1 and 3. The shaft B, already referred to, extends the full distance between the hubs of the wheels and is tubular, inclosing a second shaft B', which may be either hollow or solid and which also extends the full distance between the wheel-hubs.

Shaft B is driven directly through a pinion $d$ on the motor-shaft and a spur-gear $d'$ on shaft B. At one end of the latter is fastened a cup or cage G, which carries on opposite sides two bevel-pinions $g\ g'$, which rotate on short studs fixed in the cup. (See Fig. 3.) The axes of these pinions are in the same line radial of the shaft B. Engaging these pinions on one side is a bevel-gear G', which is keyed to the flange of the hub H of the wheel, the said hub being a tubular box which incloses the compensating driving mechanism and is supported at the inner end by the ring or closure H'. On the other side of pinions $g$ from gear G' is another bevel-gear $G^2$, which is keyed to the inner shaft B', the latter being loose in tubular shaft B. At the other side of the vehicle the wheel-hub $H^2$, Fig. 1, is keyed to the inner shaft B' and turns loosely on shaft B. Thus the rotation of shaft B carries the pinions $g$ of the compensating mechanism in a circular path around the axis of the shaft, and these pinions engaging with the bevel-gears G' $G^2$ rotate them in the same direction, the pinions not ordinarily rotating themselves, but acting simply as driving-keys. Bevel-gear G', being keyed directly to hub H, imparts motion to that driving-wheel, while gear $G^2$ through the intermediary of the inner shaft B' imparts motion to the hub $H^2$ of the other driving-wheel. Obviously when the vehicle changes the direction of its line of travel, tending to accelerate the motion of one wheel and correspondingly diminish that of the other, the pinions $g\ g'$ by turning on their axes will permit this differential motion.

The principal advantages of this construction are that the driving-shafts extend continuously from side to side of the vehicle, affording maximum strength, that the compensating mechanism is readily accessible upon removal of the wheel in whose hub it is inclosed, that it occupies no extra space and requires no special housing, and that it is characterized by simplicity of construction and requires a relatively small number of parts.

Keyed on the driving-shaft and adjacent to the driving-spur $d'$ is a brake-drum $d^2$. Mounted at its lower end upon the housing $D^2$ is a bell-crank lever R, having two studs $r\ r$, extending therefrom, as shown, and a brake-band R' passes about the drum and is attached at its ends to the studs on the lever. A connecting-rod passes forward from the upper end of the lever to a lever under control of the foot of the occupant of the vehicle. The operation is obvious. When the operator presses his foot upon the upper lever, the rod draws the upper end of the brake-lever R forward and the studs on the lever are also carried forward, each stud pulling forward its respective end of the brake-band. The result is that the band is applied with double force and rapidity around the greater portion of the periphery of the drum.

The steering is effected through the front wheels, which, as usual, are loose on their axles. The hubs of the wheels are pivoted so as to turn for the purpose of steering on a vertical axial line in the plane of the tread of the wheel. This construction is common in vehicles of this class and its advantages are well understood. There are, however, special features of construction in the steering-heads, which will now be described.

Fig. 2 illustrates a type of steering-head designed especially for heavy vehicles, while Fig. 5 shows a simplified construction suitable for lighter vehicles. The main features of the two forms are identical. Referring first to the former, K represents a cylindrical box or casing into which the end of axle A extends and to which it is pivoted by means of a vertical bolt K' in the plane of the tread of the wheel. At the end of the axle on its upper side is a circular ball-race surrounding bolt K' and containing the balls $k$, on which a conical shoulder $k'$ on bolt K' bears. A second set of balls $k^2$ is interposed between the axle and box K, the upper bearing-surface being conical.

The bearing-surfaces or shoes are of suitable hardened metal. It is to be observed that the function of the balls is not only to support the weight bearing upon the parts, but also to hold the pivot-bolt K' centrally in its aperture free from contact with the axle except at the ball-bearing surface, and, further, to permit taking up wear and end thrust by tightening up the nut on bolt K'. To the box K is attached an arm $m$, an arm $m'$ forming therewith a right-angled lever, of which the bolt K' is the pivot. The lever $m\ m'$ is connected to the steering-handle through connections hereinafter described.

Box K is inclosed by the cylindrical hub N, ball-bearings being interposed between these parts, so that the hub rotates on box K. The hub carries two annular ball-races $n\ n'$. Each of these is a trough-shaped ring which is introduced into the open side of the cylindrical hub and driven up against a shoulder $n^2$, formed on the inner surface of the hub. Race $n$ is held in place by threaded disk N', screwed into the hub, closing that side thereof. Race $n'$ is similarly held in place by a threaded ring $N^2$, through whose central opening the axles A and arm $m$ pass. Each race has an annular ball-retainer and dust-excluder $n^3$, made of thin sheet metal L-shaped in cross-section. The bearings on the box are hard-steel rings $n^4$ $n^5$, having inclined bearing-surfaces. The balls and bearing-surfaces are, as shown, so arranged as not only to form bearings for the hub, but also to permit of taking up wear and end thrust by adjustment of the relative positions of the races and beveled bearing-surfaces. The parts are easily assembled, and the steering-head as a whole is but little liable to derangement.

The construction shown in Fig. 5 differs from that in Fig. 2 only in that for the ball-bearing swivel-joint between the axle and steering-arm are substituted cone-bearings formed by conical pointed pins $K^2$ (one of which is shown in the drawings) entering conical sockets in the axle A. This construction operates well with light vehicles.

The foregoing description applies to both the forward wheels. The arms $m'$ $m'$ of the steering-levers are connected by a cross-bar $m^2$, pivoted to each, so that the arms $m'$ $m'$ move together. One of the arms $m'$ is prolonged, and to its end is connected, preferably by a universal joint, a link $o$, whose opposite end is pivoted to a crank-arm $o'$, attached to and operated by a vertical spindle or steering-arm $o^3$, which has at its upper end an operating-handle. (Not shown.) On turning spindle $o^3$ link $o$ is moved longitudinally in one direction or the other, tilting the angular steering-levers $m'$ $m'$, one of them directly and the other through cross-bar $m^2$. The positions assumed by the wheels and steering-gear in making a turn are indicated by dotted lines. It is to be noticed that in moving in a curved line the two wheels of a pair tend to assume different angles, the inner wheel, which travels on a curve of shorter radius than that of the outer wheel, assuming the greater angle of inclination. The construction described permits of the necessary accommodation to this condition, and it will be seen by observing its operation that whichever way the vehicle turns the inner wheel will make the greater deflection. This is due to the relative lengths of the arms $m$ and $m'$, measuring the latter from the joint $p$ or $p'$, where it connects with cross-bar $m^2$, to the angle it makes with arm $m$. Assuming the parts to be in the positions indicated by dotted lines, it will be seen that the arc on which joint $p'$ moves is such as to have brought the joint nearer to the axle, while joint $p$, on the contrary, has moved farther from the axle and nearer to the normal plane of the tread. Consequently the inner wheel, which moves on the curve of shorter radius, has the greater inclination. Obviously the greater the movement of the steering-levers the greater will be the difference of inclination, and if the steering-spindle be turned in the opposite direction the conditions will be reversed.

Experiment shows that the proper operation is best attained when an imaginary line $q$, drawn from the pivot $K'$ to pivot $p$, makes with arm $m'$ an angle of twenty-two and one-half degrees.

An advantage of the steering-gear described above is its freedom from cog-gearing and from liability to derangement by the motion and jolting of the vehicle.

Having thus fully described my invention, what I claim as new, and desire to secure by Letters Patent, is—

1. A running-gear frame for motor-vehicles comprising the front and rear axles and two side bars connecting them, the said bars being each attached to the rear axle by a universal joint, and one of the bars being secured rigidly to the front axle while the other is secured thereto by a pivotal connection, substantially as described.

2. In a running-gear frame, a side bar pivotally connected to the front axle and connected by a universal joint to the rear axle, substantially as described.

3. In a running-gear frame, a side bar secured rigidly to the front axle and by a universal joint to the rear axle, substantially as described.

4. An approximately rectangular running-gear frame, in which one of the side bars is connected rigidly to the front axle, while the other is connected thereto loosely, substantially as described.

5. An approximately rectangular running-gear frame consisting of a front axle, a rear axle, an inclosing casing in which the rear axle is adapted to rotate, and side bars having a loose connection with said casing, substantially as described.

6. A four-side running-gear frame in which one of the joints is rigid and the others loose, substantially as described.

7. The combination of the rotating axle having a collar near each end, the relatively-stationary or non-rotating casing surrounding the axle and having an enlargement at each end, the ball-bearings situated within the enlargements and against the outer side of the collars, and means for tightening the balls up against the collars, substantially as described.

8. In a running-gear frame of a motor-vehicle, the combination with the revolving shaft or axle, and the relatively-stationary casing surrounding it and having a spherical seating near each end, of the side bars mounted to turn freely upon the seatings and connected at their forward ends to the fore axle, the forward portion of the casing being supported from the frame, substantially as described.

9. The combination with a tubular axle having a road-wheel mounted to rotate upon each end thereof, of a shaft turning freely inside the hollow axle, said shaft having one of said wheels fast upon one end thereof, and near the other end a compensating gearing connecting with the other wheel, substantially as described.

10. The combination with a hub and a cylindrical box upon which it is mounted to rotate freely, of the axle, a bolt passing through the axle and the box and pivoting the latter upon the former, the said bolt having a conical shoulder near its upper end, and two sets of ball-bearings, one between the said shoulder and the upper face of the axle, and the other between the lower face of the axle and the cylindrical box, substantially as described.

11. In combination with the axle, a hub having near each end a raceway for ball-bearings, the raceways being in the form of removable trough-shaped rings fitted into the hub, and a cylindrical box mounted pivotally on the axle and having annular bearing-surfaces in contact with said balls, and holding-disks for the ball-races screwed into the hub at the ends thereof, substantially as described.

12. The combination of the axle, the cylindrical box connected with the axle by a vertical bolt, two sets of ball-bearings one on each side of the axle between the same and said bolt, rings having beveled bearing-surfaces, one on each end of said box, and a hub inclosing said box and carrying two ball-races, the balls therein being in contact with said beveled bearing-surfaces, substantially as described.

In testimony whereof I have signed this specification in the presence of two subscribing witnesses.

ANDREW L. RIKER.

Witnesses:
 THOS. L. PROCTOR,
 JNO. B. MALONE.